(12) United States Patent
Kalish

(10) Patent No.: US 10,109,317 B2
(45) Date of Patent: Oct. 23, 2018

(54) SYSTEM AND METHOD FOR GENERATING AND PLAYING INTERACTIVE VIDEO FILES

(71) Applicant: IDOMOO LTD, Hod Hasharon (IL)

(72) Inventor: Danny Kalish, Raanana (IL)

(73) Assignee: IDOMOO LTD., Hod Hasharon (IL)

(*) Notice: Subject to any disclaimer, the term of this patent is extended or adjusted under 35 U.S.C. 154(b) by 0 days.

(21) Appl. No.: 15/286,852

(22) Filed: Oct. 6, 2016

(65) Prior Publication Data

US 2018/0102142 A1    Apr. 12, 2018

(51) Int. Cl.
| | |
|---|---|
| H04N 5/77 | (2006.01) |
| H04N 9/80 | (2006.01) |
| G11B 27/031 | (2006.01) |
| G11B 27/34 | (2006.01) |
| G11B 27/30 | (2006.01) |
| G06F 3/0484 | (2013.01) |
| G06F 3/0482 | (2013.01) |

(52) U.S. Cl.
CPC ............ G11B 27/031 (2013.01); G11B 27/30 (2013.01); G11B 27/34 (2013.01); *G06F 3/0482* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 9,583,147 B2* | 2/2017 | Abecassis | G11B 27/105 |
| 2007/0174773 A1* | 7/2007 | Abernethy, Jr. | H05B 37/029 715/716 |
| 2015/0248917 A1* | 9/2015 | Chang | H04N 21/8549 386/282 |

* cited by examiner

*Primary Examiner* — Heather R Jones
(74) *Attorney, Agent, or Firm* — Browdy and Neimark, P.L.L.C.

(57) ABSTRACT

A method for real-time generation of action while playing of at least one interactive video. The method includes generating an interactive video having event data parameters indicating of association of pre-defined triggering events with object properties changes through video; identifying triggering events while playing the interactive video based on defined event parameters of video object properties changes, sending interactive instruction based on triggering events while playing the video, applying predefined action at external computer based entity which is not part of the player, based on received instructions.

14 Claims, 11 Drawing Sheets

| Create External interaction rules using the Video Builder UI |

- The external interaction rules define actions that would be taken in the real world (e.g. sending an email), in relation to predefined triggering events.
- The Video Builder module aggregates all the information included in the interactive video. It incorporates this information in an "Encapsulated video file"
- The Video Builder UI is a designer's interface for creating Interactive videos. It facilitates creation of external and internal interaction rules, and applying them to a video sequence.

| Select the type and features of an external interactive action from a predefined set of possible actions     1010 |

| Select whether the external interaction rule is to be applied statically (i.e. for all presentations of the video sequence), or dynamically (i.e. apply a different action with every presentation of the video sequence)     1020 |

| In case the external interaction rule is to be applied dynamically, configure parameters for diversifying the external interactive action between playbacks. These parameters may relate to the user's profile, the environment and the context of playback.     1030 |

| Set up all the information required in order to invoke the selected external interactive action, e.g.: Required communication protocol, Address and Data, Execution scripts, Application names, Process names and IDs, Service names, etc.     1040 |

| Define events in the video template as triggers for interactive action |

| Define events of object property changes in the video sequence as triggers for interactive action     1050 |

| Define specific events and actions in the content and context of a video sequence as triggers for interactive action. These events and actions would be identified by applying scene analysis methods during playback. For example: a scene of rain may invoke flashes in the room lighting, to simulate lightning.     1060 |

| Optionally – export external interaction rules as independent layers. Such layers of external interaction rules may be imported for use in other projects.     1070 |

Figure 2

| Create Internal interaction rules using the Video Builder UI |

- The Internal interaction rules define conditions that would apply changes in the presented video sequence. These rules may relate to the viewer's user profile as well as environmental and contextual parameters
- Internal interaction rules may be applied statically (i.e. per each presentation of the video sequence), or dynamically (i.e. apply a different action with every presentation of the video sequence)

| Select the type and features of an internal interactive action from a predefined set of possible actions    1110 |

| Select whether the Internal interaction rule is to be applied statically or dynamically    1120 |

| Set up all the information required in order to invoke the selected Internal interactive action, e.g.: Changes in media object parameters (e.g. color, lighting), Selection and ordering of Media units (e.g. change the video sequence according to user input), Incorporation of additional media objects into existing media units (e.g. add a scene to the video sequence)    1130 |

| If the rule is to be applied dynamically, configure parameters for diversifying the interactive action between playbacks. These parameters may relate to the user's profile, the environment and the context of playback (e.g.: Show pink object for girls, blue for boys).    1140 |

| Optionally – export Internal interaction rules as independent layers. Such layers of rules may be imported for use in other projects.    1150 |

Figure 3

| Encoder of Interactive encapsulated video files |
|---|
| • The Video Builder module aggregates all the information included in the interactive video. It incorporates this information in an "Encapsulated video file"<br>• The Video Encoder module produces a compressed, exportable interactive video file from the data incorporated in the Encapsulated video file. |
| Obtain an Encapsulated Video file from the Video builder module. This file incorporates media objects and media units as well as optional External and Internal interaction rules data    3010 |
| Optionally - present the interactive video on-the-fly in a video stream.    3020 |
| In case the Video Encoder module is playing the interactive video sequence on-the-fly as a video stream:<br><br>• Identify triggering events in the video format based on defined event conditions including video object properties, timing, content, context, and behavior<br>• Accept input from the user viewing the video stream. This input may be applied as triggers for internal interactive actions (e.g. providing the viewer's gender will invoke different appearances of the video sequence)<br>• Take into account all conditions and actions as elaborated above, to perform frame-by-frame rendering of the presented video sequence and the adjoined audio stream<br>• Apply actions on the remote external interactive entity, as were defined according to the external interactive rules, embedded in the encoded, encapsulated video file format. These actions will be applied in conjunction with the identification of triggering events, as elaborated above.    3030 |
| Process the Encapsulated Video file, compress each video object optimally according to its type, and produce an encapsulated, encoded, interactive (external and internal) video file.    3040 |

Figure 6

| Present the interactive encapsulated encoded video format with a dedicated Decoder/Player |

- The Video Decoder / Player module is designed to play interactive video sequences, applying the Internal and External interactive rules that were incorporated in the Encoded Interactive Video format.

| Uncompress and Extract the different types of data aggregated in the encapsulated, encoded video file:<br>•Video and audio Media objects, and media objects parameters<br>•Media units parameters<br>•Internal and External interactive rules            5010 |

| Identify triggering events in the extracted video data, based on rules that are embedded within that same file. These rules apply to events and conditions such as video object properties, timing, content, context, and behavior     5020 |

| Receive input from the user viewing the video stream. This input may be applied as triggers for interactive actions (send email when pressing the 'Enter' key) or for diversifying the action (e.g. providing the viewer's gender will invoke different actions)    5030 |

| Optionally receive input from the user viewing the video stream. This input may be applied as triggers for internal interactive actions (e.g. providing the viewer's gender will invoke different appearances of the video sequence)     5040 |

| Apply actions to the video sequence, as were defined according to the internal interactive rules, embedded in the encoded, encapsulated video file format. These actions will be applied in conjunction with the identification of triggering events, as elaborated above.     5050 |

| Take into account all conditions and actions as elaborated above, to perform frame-by-frame rendering of the presented video sequence and the adjoined audio stream.     5060 |

| Apply actions on the remote external interactive entity, as were defined according to the external interactive rules, embedded in the encoded, encapsulated video file format. These actions will be applied in conjunction with the identification of triggering events, as elaborated above.     5070 |

| Optionally - export the encapsulated video and audio data to an industry standard video file format, e.g.: MPEG4     5080 |

Figure 8

Presenting interactive video with the dedicated decoder /player module, importing external interactive rules ' layers

- The Video Decoder / Player module is designed to play interactive video sequences, applying Internal and External interactive rules that were imported from interaction rule layers.

Obtain a video file to play. This file may be either an industry standard format (e.g. MPEG4) or an encapsulated, encoded interactive video file, prepared by the video encoder module.

Import an interactive rules' layer file. This layer file is generated by the video builder module, and exported for use by the decoder / player module.

Extract interaction rules from the interactive rules' video file. These rules may be based on defined event s and conditions in the video file, e.g. timing , content , context , and behavior Identify triggering events in the video file, that match the extracted interaction rules.

Take into account all conditions and actions as elaborated above, to perform frame-by-frame rendering of the presented video sequence and the adjoined audio stream.

Apply actions on the remote external interactive entity, as were defined according to the external interactive rules , embedded in the interactive rules' layer file. These actions will be applied in conjunction with the identification of triggering events, as elaborated above.

SYSTEM AND METHOD FOR GENERATING AND PLAYING INTERACTIVE VIDEO FILES

FIELD OF THE INVENTION

The present invention relates generally to generation of interactive video files having interaction with external entities.

SUMMARY OF THE INVENTION

The present invention provides a method for real-time generation of action while playing of at least one interactive video. The method comprising the steps of: generating an interactive video having event data parameters indicating of association of pre-defined triggering events with object properties changes through video; identifying triggering events while playing the interactive video based on defined event parameters of video object properties changes; sending interactive instruction based on triggering events while playing the video; applying predefined action at external computer based entity which is not part of the player, based on received instructions; wherein the generating sending and applying, are performed by at least one processor.

According to some embodiments of the invention, each interactive event is identified by a unique event type.

According to some embodiments of the invention the event data are associated with time log, optionally timing relative to scene, translating to absolute time within the video.

According to some embodiments of the invention the event data are associated with condition logic in relation to property change.

According to some embodiments of the invention the event data are associated with context, content or behavior by analyzing of content, context or behavior within video.

According to some embodiments of the invention the video generation includes generating an interactive rule layer file including the event data parameters.

According to some embodiments of the invention the video generation includes embedding in event data parameters within encapsulated video file format.

According to some embodiments of the invention event data parameters may relate to the user's profile, the environment and the context of video.

According to some embodiments of the invention the event parameters data includes all the information required in order to invoke the selected external interactive action including at least one of required communication protocol, Address and Data, Execution scripts, Application names or Process names.

The present invention provides a system for real-time generation of action while playing of at least one interactive video. The system comprises: Video Builder module enabling to generate an interactive video having event data parameters indicating of association of pre-defined triggering events with object properties changes through video; Video Decoder Player module for identifying triggering events while playing the interactive video based on defined event parameters of video object properties changes and sending interactive instruction based on triggering events while playing the video; and Remote external interactive Entity for applying predefined action at external computer based entity which is not part of the player, based on received instructions.

According to some embodiments of the invention each interactive event is identified by a unique event type.

According to some embodiments of the invention the event data are associated with time log, optionally timing relative to scene, translating to absolute time within the video.

According to some embodiments of the invention the event data are associated with condition logic in relation to property change.

According to some embodiments of the invention the event data are associated with context, content or behavior by analyzing of content, context or behavior within video.

DESCRIPTION OF THE DRAWINGS

FIG. 2 depicts a flow diagram of the process carried out by an interactive video designer, to create External interaction rules, using the Video Builder UI according to some embodiments of the present invention.

FIG. 3 depicts a flow diagram of the process carried out by an interactive video designer, to create Internal interaction rules, using the Video Builder UI, according to some embodiments of the present invention.

FIG. 6 depicts a flow diagram of the Encoder of Interactive encapsulated video files, hereby referred to as the 'Encoder' for abbreviation, according to some embodiments of the invention.

FIG. 8 depicts a flow diagram for presenting the interactive encapsulated encoded video format with a dedicated Decoder/Player module, according to some embodiments of the invention.

FIG. 9 depicts a flow diagram for presenting the interactive video with the dedicated decoder/player module, importing external interactive rules' layers, according to some embodiments of the invention.

DETAILED DESCRIPTION OF SOME EMBODIMENTS OF THE INVENTION

Figure 1A:
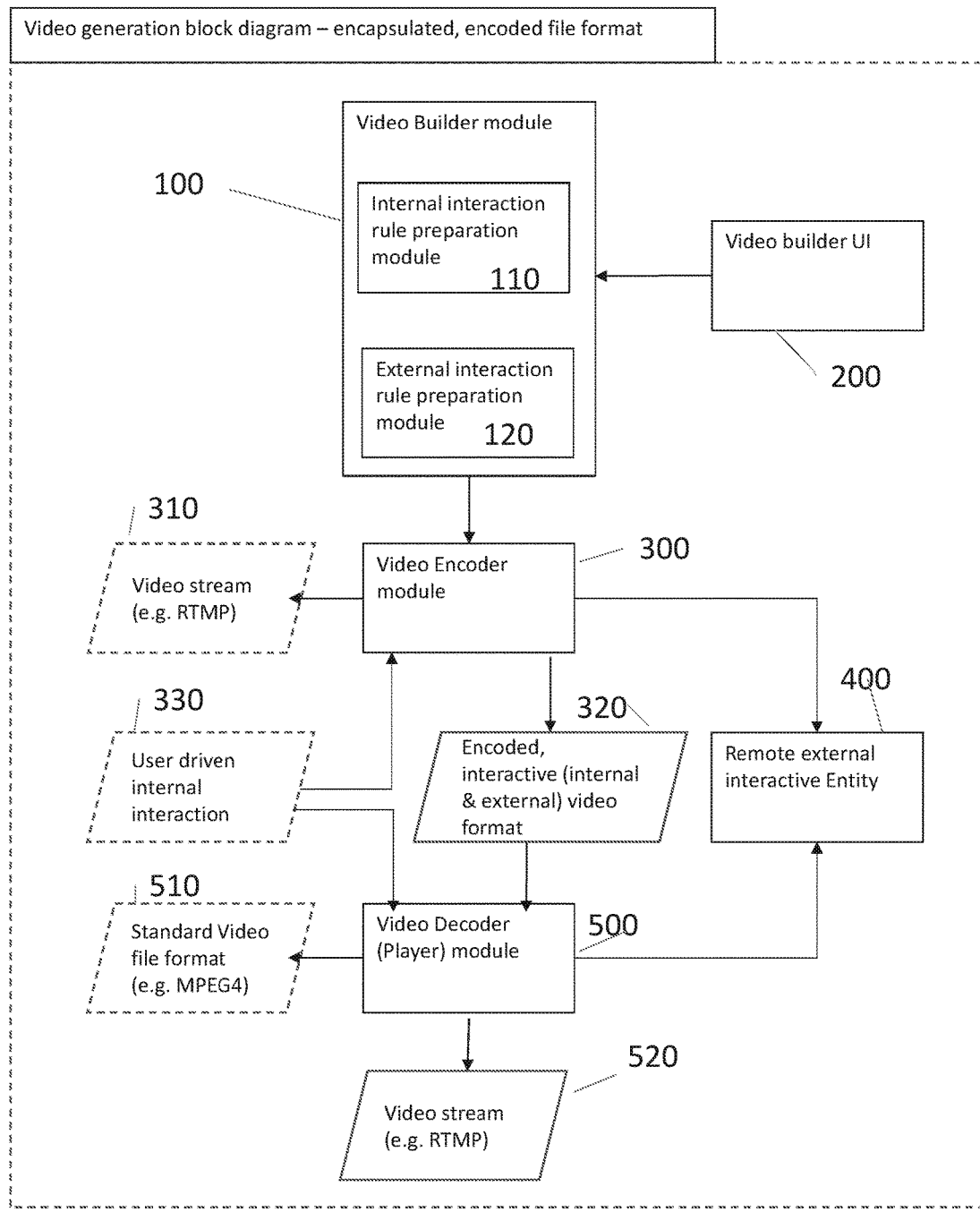
FIG. 1A depicts a block diagram of the process of creating an interactive, encapsulated, encoded video file, and playing it by dedicated modules, according to one embodiment of this invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention described henceforth relates to a method and a system for creating and playing interactive video sequences. The interactive properties of the video sequence are manifested as rules, which are comprised of triggering conditions and subsequent actions that would be taken when the conditions are met. Following is a table of definitions of the terms used throughout this application,

| Term | Definition |
|---|---|
| Media Object | Basic building block of video media unit. Media Objects' properties may include:<br>Material properties of objects for each frame, e.g. color, position, visibility, opacity, shape, size etc.<br>Motion properties<br>Special effects properties, e.g.: lighting, shading etc.<br>Each object type may require different optimal compression definitions |
| Media Unit | Basic block of a displayable video sequence comprised of media objects (see above). This is the basic building block of an encapsulated video file. |
| Media Unit configuration parameters | Environment parameters<br>Context parameters<br>User profile parameters |
| Encapsulated video file | A file format comprised of one or more media units, in addition to static or dynamic customization parameters. These parameters determine the selection and order of media units to display, as well as customization of media object appearance (e.g. color and motion) |
| Video Builder and Video Builder UI | A software tool and UI, designed to assemble and compile Encapsulated Interactive video files, encompassing all the information as described above. |
| Dynamic Vs. Static Interaction rules | Dynamic: Interaction rules are applied according to environmental parameters (e.g. time of day), Context or user profile configuration parameters (e.g. name of logged user).<br>Static: Interaction rules are applied according to predefined, global and constant parameters |
| Encoder | A software module, designed to encode Encapsulated Interactive video file formats. The Encoder<br>    Compresses the encapsulated video file according to the type and content of each resident media object, to achieve optimum compression ratios<br>    Optionally produces video playback streams (e.g. in RTMP format) from encapsulated files.<br>    Optionally applies Internal interactive actions to the video sequence during streaming of video playback, according to Internal interactive rules embedded in the encapsulated file format.<br>    Optionally applies External interactive actions during streaming of video playback, according to the External interactive rules embedded in the encapsulated file format.<br>    External interactions will be applied on any "Remote External Interactive Entity". |
| Decoder | A software module, designed to<br>    Display Encoded Encapsulated Interactive video files<br>    Applies Internal interactive actions to the video sequence<br>    Applies External interactive actions to "Remote External Interactive Entities" |
| Interactive rule conditions | Interactive rule conditions serve as triggers that invoke actions during video playback. These conditions may relate to:<br>    Changes in video object properties (e.g. appearance of a specific video object. Or color change of object, or movement of object)<br>    Video timing, video time log (e.g. location within the video sequence)<br>    Video context (e.g. different appearance when presenting the video on Christmas)<br>    Video content (e.g. whenever music is played)<br>    Identified behavior of one or more objects within the video |
| Interactive rule actions | Interactive rule actions may either apply changes to the appearance of the video sequence (e.g. change the color of a video object) or apply actions to processes that are external to the video sequence (e.g. send an email). |

The invention relates to two types of interaction rules:
Internal interaction rules define conditions that would apply changes in the presented video sequence (e.g. change the color of a video object). These rules may relate to the viewer's user profile as well as environmental and contextual parameters; and
External interaction rules define actions that would be taken in the "real world", beyond the displayed video sequence (e.g. sending an email or handling an electrical appliance), following triggering events in the video sequence.

According to one embodiment of the invention, the interaction rules (internal and external) are embedded within an encapsulated, encoded file, in conjunction with the video sequence to be played.

According to another embodiment of the invention, the interaction rules (internal and external) are manifested as "Interactive rule layer" files. These files are created independently and separately from the actual video sequence, and may be exported and applied to multiple video sequences.

FIG. 1A depicts a block diagram of the process of creating an interactive, encapsulated, encoded video file, and playing it by dedicated modules, according to one embodiment of this invention.

The Video Builder UI is a designer's interface for creating Interactive videos. The Video Builder UI:

Enables designers to select, create and customize media objects to display; and

Facilitates creation of external and internal interaction rules, by providing a platform for defining internal and external interaction rules' conditions and actions.

The Video Builder module aggregates all the information included in the interactive video. It incorporates this information in an "Encapsulated video file"

The Video Encoder module:

Creates encoded (i.e. compressed, transferable, encapsulated interactive video) files from encapsulated files produced by the Video Builder module.

Optionally produces video playback streams (e.g. in RTMP format) from encapsulated files.

Optionally applies Internal interactive actions to the video sequence during streaming of video playback, according to the Internal interactive rules embedded in the encapsulated file format.

Optionally obtains user-driven interactive input. This input may be applied as triggers for Internal interactive actions (e.g. providing the viewer's gender will invoke different appearances of the video sequence) during video playback.

Optionally applies External interactive actions during streaming of video playback, according to the External interactive rules embedded in the encapsulated file format. External interactions will be applied on any "Remote External Interactive Entity".

The designated Video Decoder/Player module:

Decodes encoded encapsulated interactive video files.

Plays the said video files, or produces a video stream (e.g. in RTMP format).

Applies internal interactive actions to the video during video playback, according to the Internal interactive rules embedded in the encapsulated file format.

Applies External interactive actions during video playback, according to the External interactive rules embedded in the encapsulated file format. External interactions will be applied on any "Remote External Interactive Entity".

Optionally obtains user-driven interactive input. This input may be applied as triggers for Internal interactive actions (e.g. providing the viewer's gender will invoke different appearances of the video sequence) during video playback.

"Remote External Interactive Entities" are any type of entities, either physical (e.g., Electrical appliance, computer, communication device) or virtual (e.g. a software application, process or service running on any local or remote computing machine) that would be affected by External interactive rule actions. For example—a ventilator may be activated whenever there is a sequence of a storm in the video.

Figure 1B:
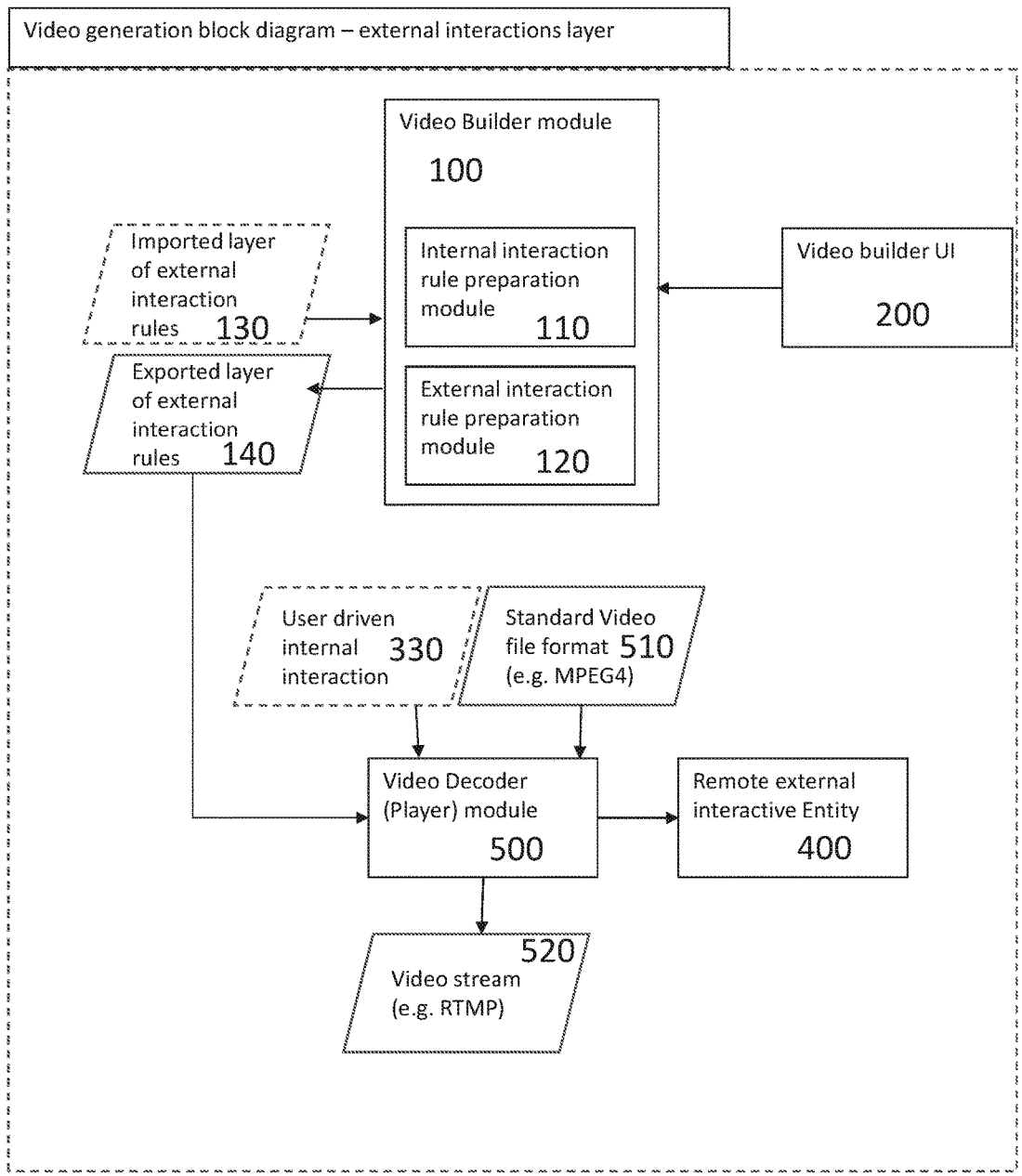
FIG. 1B depicts a block diagram of the process of creating independent Interaction rule layer files, and applying them to video files and Remote external interactive entities, according to another embodiment of this invention.

FIG. 1B depicts a block diagram of the process of creating independent Interaction rule layer files, and applying them to video files and Remote external interactive entities, according to another embodiment of this invention.

The Video Builder UI is a designer's interface for creating Interactive videos. One of the Video Builder UI's tasks is to facilitate the creation of external and internal interaction rules, through the internal and external interaction rule preparation modules. In this depicted embodiment of the invention, the Video Builder UI is utilized to define the content of independent, External and Internal, Interaction rules' Layer files.

The Video Builder module generates the External and Internal, Interaction rules' Layer files according to the configurations set in the Video Builder UI module. These Layer files may be either imported to the Video Builder as references, or exported, to be independently applied on any video sequence.

The Video Decoder/Player module is designed to play interactive video sequences, applying Internal and External interactive rules that were extracted from interaction rule layer files. In the depicted embodiment, the Video Decoder/Player module:

Obtains a video file to play. This file may be either an industry standard format (e.g. MPEG4) or an encapsulated, encoded interactive video file, prepared by the video encoder module.

Plays the said video files, or produces a video stream (e.g. in RTMP format).

Imports interactive rules' layer files, generated by the video builder module

Applies Internal interactive actions to the video sequence during video playback.

Applies External interactive actions to Remote External Interactive Entities during video playback.

Optionally obtains user-driven interactive input. This input may be applied as triggers for Internal interactive actions (e.g. providing the viewer's gender will invoke different appearances of the video sequence) during video playback.

FIG. 2 depicts a flow diagram of the process carried out by an interactive video designer, to create External interaction rules, using the Video Builder UI. The external interaction rules define actions that would be taken in the real world (e.g. sending an email), in relation to predefined triggering events.

Select the type and features of an external interactive action from a predefined set of possible actions.

Select whether the external interaction rule is to be applied statically (i.e. for all presentations of the video sequence), or dynamically (i.e. apply a different action with every presentation of the video sequence). In case the external interaction rule is to be applied dynamically, configure parameters for diversifying the external interactive action between playbacks. These parameters may relate to the user's profile, the environment and the context of playback.

Set up all the information required in order to invoke the selected external interactive action, e.g.: Required communication protocol, Address and Data, Execution scripts, Application names, Process names and IDs etc.

Define events in the video template as triggers for interactive action.

Define events of object property changes in the video sequence as triggers for interactive action.

Define specific events and actions in the content and context of a video sequence as triggers for interactive action. These events and actions would be identified by applying scene analysis methods during playback or based on defined time log. For example: a scene of rain may invoke flashes in the room lighting, to simulate lightning.

Optionally—export external interaction rules as independent layers. Such layers of external interaction rules may be imported for use in other projects.

FIG. 3 depicts a flow diagram of the process carried out by an interactive video designer, to create Internal interaction rules, using the Video Builder UI. Internal interaction rules define conditions that would apply changes in the presented video sequence. These rules may relate to the viewer's user profile as well as environmental and contextual parameters. Internal interaction rules may be applied statically (i.e. per each presentation of the video sequence), or dynamically (i.e. apply a different action with every presentation of the video sequence).

Select the type and features of an internal interactive action from a predefined set of possible actions.

Select whether the Internal interaction rule is to be applied statically or dynamically. If the rule is to be applied dynamically, configure parameters for diversifying the interactive action throughout (optionally between) video playbacks. These parameters may relate to the user's profile, the environment and the context of playback (e.g.: Show pink object for girls, blue for boys).

Set up all the information required in order to invoke the selected Internal interactive action, e.g.: Changes in media object parameters (e.g. color, lighting), Selection and ordering of Media units (e.g. change the video sequence according to user input), Incorporation of additional media objects into existing media units (e.g. add a scene to the video sequence).

Optionally—export Internal interaction rules as independent layers. Such layers of rules may be imported for use in other projects.

Figure 4:
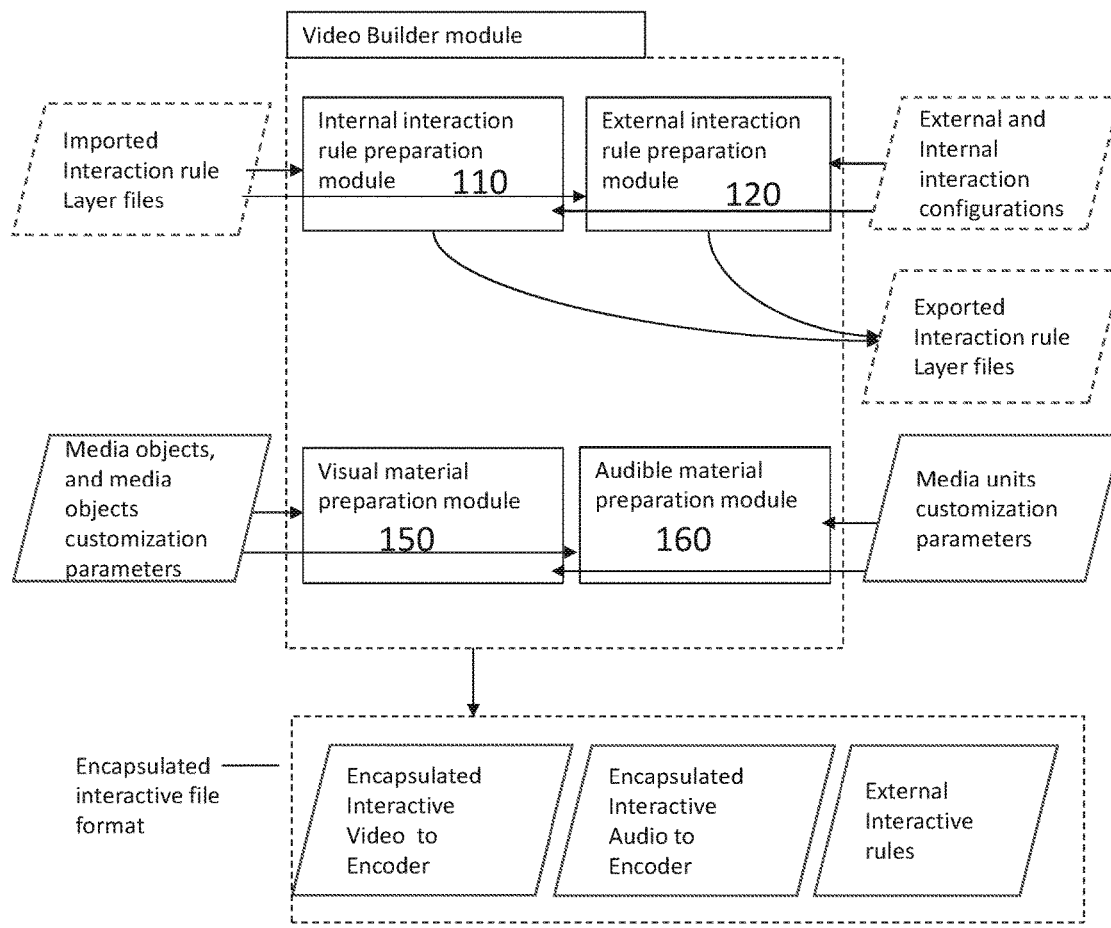
FIG. 4 depicts an elaborated block-diagram of the Video Builder module, according to some embodiments of the present invention.

FIG. 4 depicts an elaborated block-diagram of the Video Builder module. This module receives as inputs:

Media objects and media objects customization parameters, as selected, defined or configured in the Video Builder UI module (e.g. video sequences of a blue spaceship and green aliens).

Media units' customization parameters, as defined in the Video Builder UI module (e.g. the blue spaceship appears first, and then green aliens descend from it, calling the viewer by their first names).

External and Internal interaction rules, either as configured in the Video Builder UI module, or imported as Interactions rules' Layer files.

The Internal interaction rule preparation module applies Static, Internal Interaction rules to appropriate media objects. This sets global rules that would affect the video sequences' video or audio in the same way on every presentation of the video file (e.g. the alien spaceship sequence is always accompanied by the Beatle's "Yellow submarine" audio).

The internal interaction rule preparation module also applies Dynamic, Internal Interaction rules to appropriate media objects. This sets rules that would affect video sequences' video or audio differently according to predefined conditions, on every presentation of the video file (e.g. Set the alien spaceship's color to pink or blue, according to the viewer's gender).

The External interaction rule preparation module applies Static, External Interaction rules to appropriate media objects. This sets global rules that would affect Remote external interactive entities in the same way on every presentation of the video file (e.g.: When an email is mentioned on the video, send an email to a predefined address).

The External interaction rule preparation module also applies Dynamic, External Interaction rules to appropriate media objects. This sets rules that would affect Remote external interactive entities differently for each presentation of the video file, according to predefined conditions (e.g. Whenever there is a sunrise sequence in the video, invoke a different application according to the day of the week).

The Internal interaction rule preparation module and External interaction rule preparation module optionally create interaction rules' Layer files that could be exported and applied in multiple projects.

The Video material preparation module links all the information relevant for rendering the video sequence frame by frame. This includes:

Video media objects and media objects' properties (e.g. Blue alien spaceship);

Media units properties (e.g.: Selection and ordering of video media objects);

Internal interactive rules for video presentation.

This information is integrated into the Encapsulated Interactive file format.

The Audio material preparation module links all the information relevant for producing audio that is synchronized to the video sequence. This includes:

Audio media objects (e.g. "Yellow submarine" song);

Internal interactive rules for video presentation.

This information is integrated into the Encapsulated Interactive file format.

Figure 5:
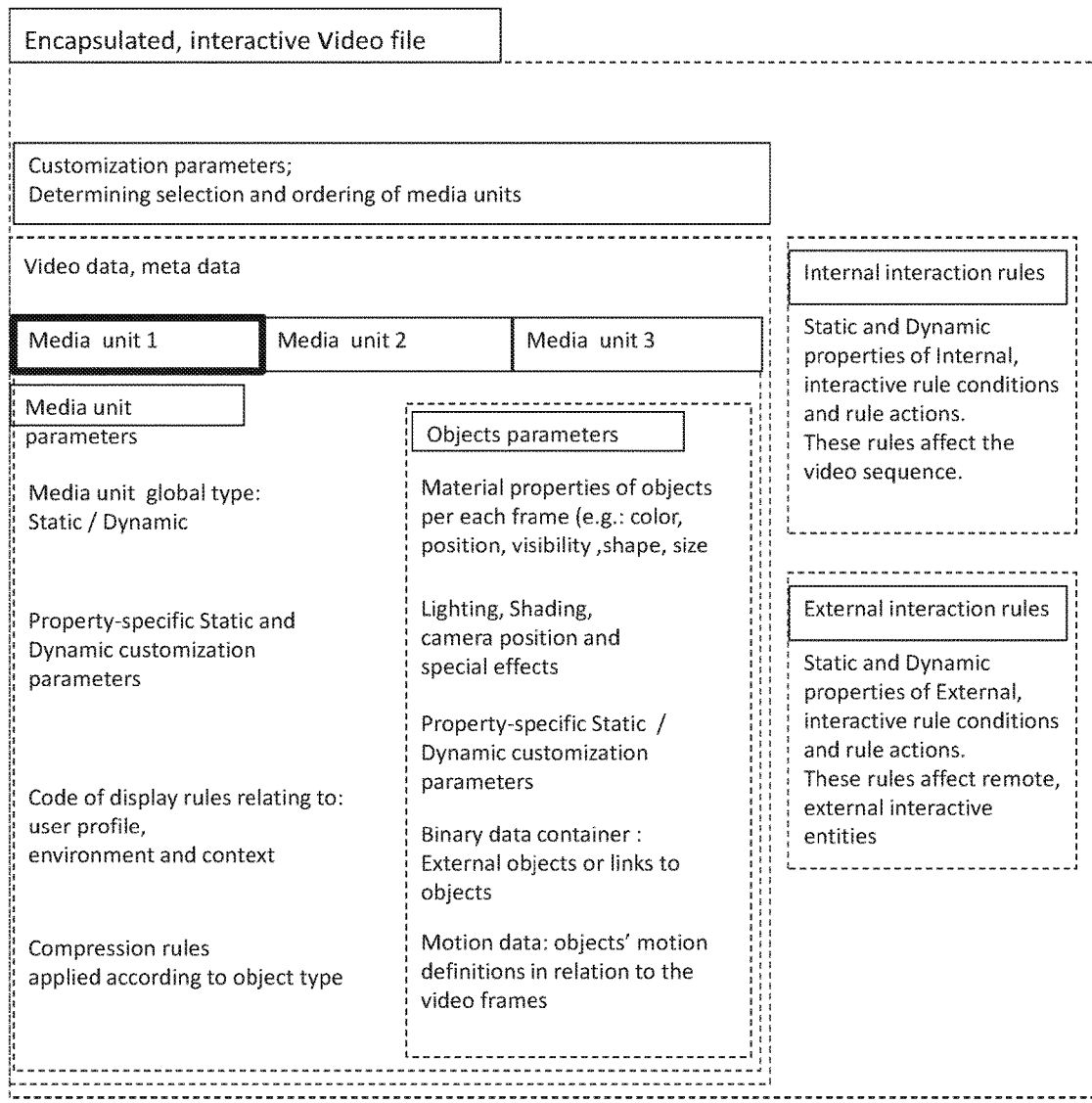
FIG. 5 depicts a diagram of the Interactive encapsulated file format, according to some embodiments of the invention.

FIG. 5 depicts a diagram of the Interactive encapsulated file format, according to some embodiments of the invention. The encapsulated file format is comprised of at least one media unit. The media unit holds at least one media object (e.g. an animated video sequence). The encapsulated file format also includes file metadata, and optionally includes:

Media unit customization parameters,

Media object customization parameters,

External Interactive rules' conditions and actions data,

Internal interactive rules' conditions and actions data.

The media unit configuration parameters are applied to determine rules for video selection and ordering. These parameters are categorized by:

User profile data (e.g.: age, gender or user preferences);

Current context or behavior (e.g.: sport event, party, sleeping, running etc.);

Environmental data (e.g.: time of day).

Media objects are attributed a dedicated set of parameters. These include:

Material parameters (e.g.: color, position, visibility, shape, size, orientation, etc.);

Special effects parameters (e.g.: lighting, shading, opacity, 3D etc.);

Motion parameters: determining media object's position in relation to each video frame or group of frames;

Camera positions and/or movement, light projection;

Binary data container: importing objects data or links to objects;

Each media object type may require a different optimal compression rule.

Static and Dynamic properties of Internal, interactive rule conditions and rule actions, that will affect the video sequence.

Static and Dynamic properties of External, interactive rule conditions and rule actions. These rules will affect remote, external interactive entities FIG. 6 depicts a flow diagram of the Encoder of Interactive encapsulated video files, hereby referred to as the 'Encoder' for abbreviation.

The Encoder obtains an Encapsulated Video file from the Video builder module. This file incorporates media objects and media units as well as optional External and Internal interaction rules.

The Encoder may optionally present the interactive video on-the-fly in a video stream. In this case, the Encoder will:
  identify triggering events in the video format based on defined event conditions including video object properties, timing, content, context, and behavior of objects.
  Accept input from the user viewing the video stream. This input may be applied as triggers for internal interactive actions (e.g. providing the viewer's gender will invoke different appearances of the video sequence).
  Take into account all conditions and actions as elaborated above, to perform frame-by-frame rendering of the presented video sequence and the adjoined audio stream.
  Apply actions on the remote external interactive entity, as were defined according to the external interactive rules, embedded in the encoded, encapsulated video file format. These actions will be applied in conjunction with the identification of triggering events, as elaborated above.

The Encoder processes the Encapsulated Video file, compresses each video object optimally according to its type, and produces an encapsulated, encoded, interactive (external and internal) video file. This file may be read by the dedicated Decoder/Player module, as elaborated below.

Figure 7A:
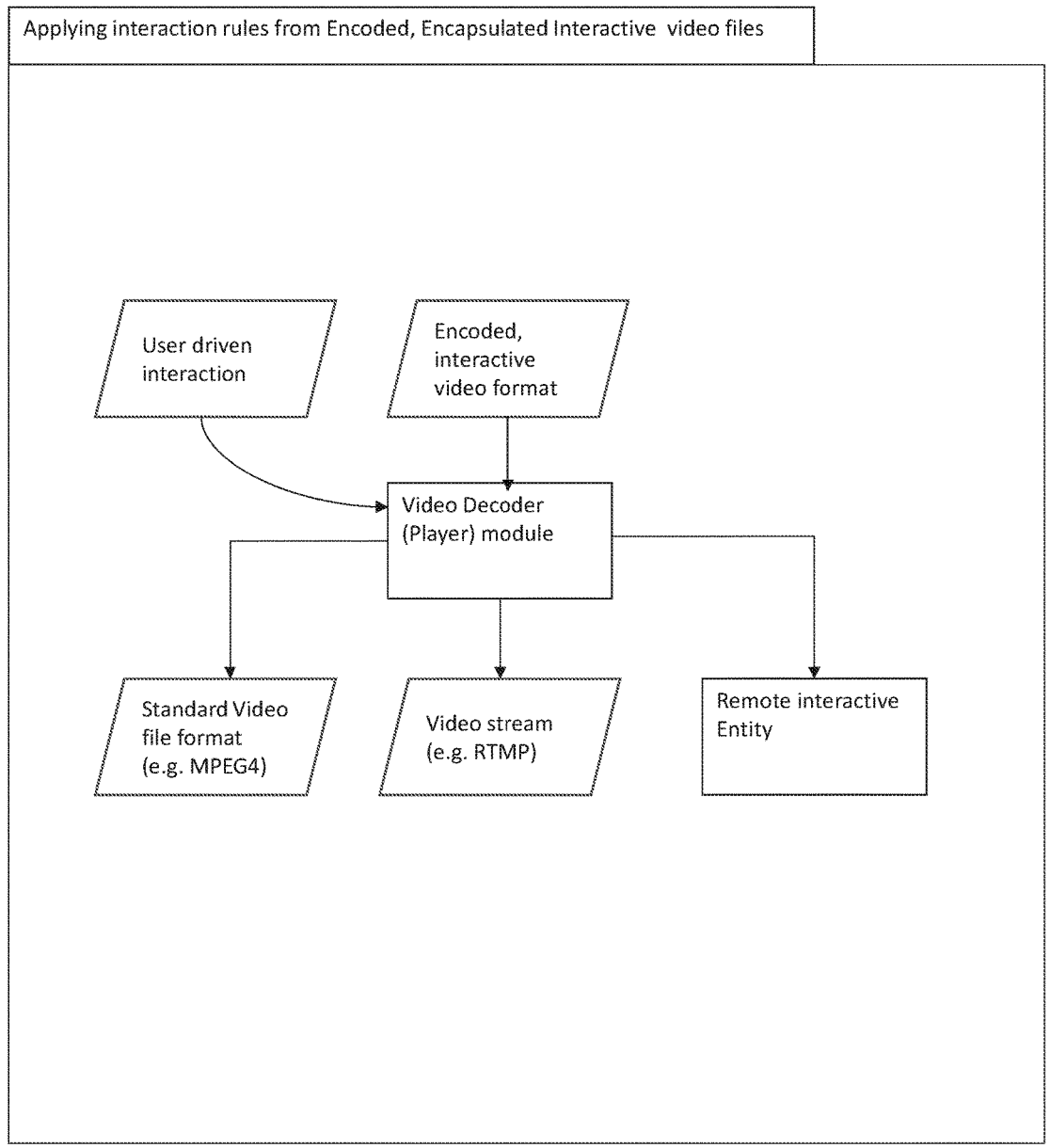
FIG. 7A depicts an elaborated block-diagram view of the Video Decoder/Player module's vicinity, during application of interaction rules from Encoded, Encapsulated Interactive video files, according to some embodiments of the invention.

FIG. 7A depicts an elaborated block-diagram view of the Video Decoder/Player module's vicinity, during application of interaction rules from Encoded, Encapsulated Interactive video files. The Video Decoder/Player module receives an Encoded, Interactive video file, extracts the Video and audio information from applies the interactive rules to remote interactive entities and to the video sequence during playback, and can optionally produce a video file in an industry-standard format (e.g. Mpeg4).

Figure 7B:
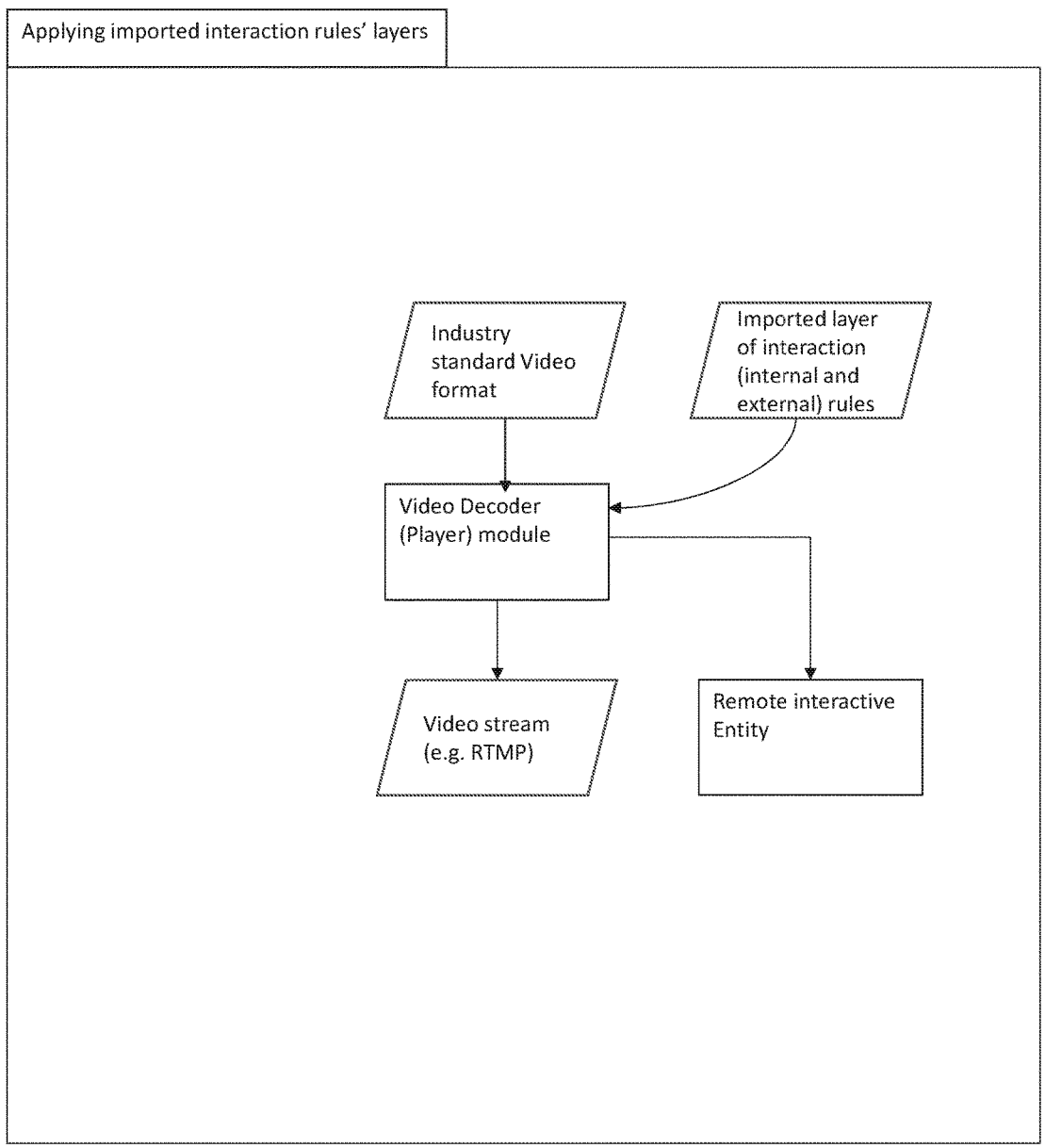
FIG. 7B depicts a block-diagram view of the Video Decoder/Player module's (hereby referred to as the 'Decoder' for abbreviation) vicinity during application of interaction rules from Interactive rule Layers files, according to some embodiments of the invention.

FIG. 7B depicts a block-diagram view of the Video Decoder/Player module's (hereby referred to as the 'Decoder' for abbreviation) vicinity during application of interaction rules from InteractiveRule Layers files.

FIG. 8 depicts a flow diagram for presenting the interactive encapsulated encoded video format with a dedicated Decoder/Player module (hereby referred to as the 'Decoder' for abbreviation). The Decoder is designed to play interactive video sequences, applying the Internal and External interactive rules that were incorporated in the Encoded Interactive Video format.

The Decoder un-compresses and Extracts the different types of data aggregated in the encapsulated, encoded video file:
  Video and audio Media objects, and media objects parameters;
  Media units parameters;
  Internal and External interactive rules.

The Decoder identifies triggering events in the extracted video data, based on rules that are embedded within that same file. These rules apply to events and conditions such as video object properties, timing, content, context, and behavior of objects.

The Decoder optionally receives input from the user viewing the video stream. This input may be applied as triggers for interactive actions (send email when pressing the 'Enter' key) or for diversifying the action (e.g. providing the viewer's gender will invoke different actions).

The Decoder applies actions to the video sequence, as were defined according to the internal interactive rules, embedded in the encoded, encapsulated video file format. These actions will be applied in conjunction with the identification of triggering events, as elaborated above.

Take into account all conditions and actions as elaborated above, to perform frame-by-frame rendering of the presented video sequence and the adjoined audio stream.

The Decoder applies actions on the remote external interactive entity, as were defined according to the external interactive rules, embedded in the encoded, encapsulated video file format. These actions will be applied in conjunction with the identification of triggering events, as elaborated above.

The Decoder optionally exports the encapsulated video and audio data to an industry standard video file format, e.g.: MPEG4.

FIG. 9 depicts a flow diagram for presenting the interactive video with the dedicated decoder/player module, importing external interactive rules' layers.

The Decoder receives a video file to play. This file may be either an industry standard format (e.g. MPEG4) or an encapsulated, encoded interactive video file, prepared by the video encoder module. It also imports an interactive rules' layer file. This layer file is generated by the video builder module, and exported for use by the decoder/player module.

The Decoder Extracts interaction rules from the interactive rules' video file. These rules may be based on defined events and conditions in the video file, e.g. timing, content, context, and behavior of objects.

The Decoder identifies triggering events in the video file that match the extracted interaction rules.

The Decoder optionally receives input from the user viewing the video stream. This input may be applied as triggers for internal interactive actions (e.g. providing the viewer's gender will invoke different appearances of the video sequence).

Take into account all conditions and actions as elaborated above, to perform frame-by-frame rendering of the presented video sequence and the adjoined audio stream.

The Decoder applies actions on the remote external interactive entity, as were defined according to the external interactive rules, embedded in the interactive rules' layer file. These actions will be applied in conjunction with the identification of triggering events, as elaborated above.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A computer-based method for real-time activation of an action while playing an interactive video on a video player, said method comprising:

generating an interactive video file having event data parameters indicating associations of predefined triggering events with changes in properties of video objects in the interactive video, wherein the event data parameters further include all information required to invoke external interactive actions including: required communications protocols, external device addresses and data, including execution scripts, and application names or process names, that specify the external interactive actions;

identifying multiple triggering events while playing the interactive video, based on multiple respective changes in multiple respective video object properties, as defined by respective event data parameters, wherein the respective event data parameters associate the multiple triggering events with multiple respective interactive actions, device addresses, and communications protocols;

sending the multiple interactive instructions, including the multiple interactive actions to multiple respective external computer-based entities defined by the multiple respective external device addresses, using the multiple respective required communications protocols; and activating the multiple interactive actions at the multiple respective external computer-based entities, which are not part of the video player, wherein the generating, identifying, sending and activating steps are performed by at least one processor.

2. The method of claim 1, wherein the event data parameters are associated with a time log, optionally timing relative to scene, translating to absolute time within the video.

3. The method of claim 1, wherein the event data parameters are associated with conditional logic in relation to the changes in the properties of video objects.

4. The method of claim 1, wherein the event data parameters are associated with context, content or behavior by analyzing content, context or behavior of objects within the video file.

5. The method of claim 1, wherein the video file generation includes generating an interactive rule layer file including the event data parameters.

6. The method of claim 1, wherein the video file generation includes embedding the event data parameters within an encapsulated video file format.

7. The method of claim 1, wherein rules of the event data parameters change dynamically according to the user's profile, the environment and the context of the interactive video.

8. A system for real-time activation of an action while playing an interactive video in a video player, said system comprising:

a Video Builder Module configured to generate an interactive video file having event data parameters indicating associations of predefined triggering events with changes in properties of video objects in the interactive, wherein the event data parameters further include all information required to invoke external interactive actions, including: required communications protocols, external device addresses and data, including execution scripts, and application names or process names, that specify the external interactive actions;

a Video Decoder Player Module for identifying multiple triggering events while playing the interactive video based on multiple respective changes in multiple respective video object properties, as defined by respective event data parameters, wherein the respective event data parameters associate the multiple triggering events with multiple respective interactive actions, device addresses, and communications protocols, and sending the multiple interactive instructions, including the multiple interactive actions to multiple respective external computer-based entities defined by the multiple respective external device addresses, using the multiple respective required communications protocols; and a Remote External Interactive Module for activating the multiple interactive actions at the multiple respective external computer-based entities, which are not part of the video player.

9. The system of claim 8, wherein the event data parameters are associated with a time log, optionally timing relative to scene, translating to absolute time within the video.

10. The system of claim 8, wherein the event data parameters are associated with conditional logic in relation to the changes in the properties of video objects.

11. The system of claim 8, wherein the event data parameters are associated with context, content or behavior of objects by analyzing content, context or behavior within the video file.

12. The system of claim 8, wherein the video file generation includes generating an interactive layer including the event data parameters.

13. The system of claim 8, wherein the video file generation includes embedding event data parameters within an encapsulated video file format.

14. The system of claim 8, wherein rules of the event data parameters change dynamically according to the user's profile, the environment and the context of the interactive video.

* * * * *